(12) United States Patent
Kobayashi

(10) Patent No.: US 12,095,953 B2
(45) Date of Patent: Sep. 17, 2024

(54) IMAGE PROCESSING SYSTEM ENABLING EASY CHECKING OF OCR ERROR IMAGE DATA, IMAGE FORMING APPARATUS, METHOD OF CONTROLLING IMAGE PROCESSING SYSTEM, METHOD OF CONTROLLING IMAGE FORMING APPARATUS, AND STORAGE MEDIUM

(71) Applicant: CANON KABUSHIKI KAISHA, Tokyo (JP)

(72) Inventor: Shinsaku Kobayashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/331,224

(22) Filed: Jun. 8, 2023

(65) Prior Publication Data
US 2023/0319197 A1 Oct. 5, 2023

Related U.S. Application Data

(63) Continuation of application No. 17/839,909, filed on Jun. 14, 2022, now Pat. No. 11,711,472, which is a
(Continued)

(30) Foreign Application Priority Data

Jul. 18, 2019 (JP) ................................. 2019-132794

(51) Int. Cl.
*H04N 1/00* (2006.01)
(52) U.S. Cl.
CPC ..... *H04N 1/00238* (2013.01); *H04N 1/00214* (2013.01); *H04N 1/00225* (2013.01); *H04N 1/00331* (2013.01)

(58) Field of Classification Search
None
See application file for complete search history.

(56) References Cited

U.S. PATENT DOCUMENTS

2014/0268246 A1* 9/2014 Ohguro .............. H04N 1/00331
358/403
2019/0065843 A1* 2/2019 Matsumoto .......... G06V 30/416

FOREIGN PATENT DOCUMENTS

| JP | 2004171199 A | 6/2004 |
| JP | 2006157249 A | 6/2006 |
| JP | 2017073591 A | 4/2017 |

OTHER PUBLICATIONS

Non-Final Office Action issued in U.S. Appl. No. 16/897,565 mailed Apr. 19, 2021.
(Continued)

*Primary Examiner* — Dov Popovici
(74) *Attorney, Agent, or Firm* — ROSSI, KIMMS & McDOWELL LLP

(57) ABSTRACT

A image processing system which make it possible to reduce user time and effort in checking OCR error image data. The image processing system performs OCR processing on image data generated by an image forming apparatus in response to selection of an object by a user and stores the image data in a folder having a folder name formed by using a character string obtained by the OCR processing. The system includes a storage control unit configured to store the image data, in a case where the character string obtained by performing the OCR processing on the generated image data does not satisfy a predetermined condition, in a folder associated with the object.

19 Claims, 16 Drawing Sheets

Related U.S. Application Data continuation of application No. 16/897,565, filed on Jun. 10, 2020, now Pat. No. 11,477,331.

(56) References Cited

OTHER PUBLICATIONS

Final Office Action issued in U.S. Appl. No. 16/897,565 mailed Oct. 22, 2021.
Notice of Allowance issued in U.S. Appl. No. 16/897,565 mailed Mar. 16, 2022.
Notice of Allowance issued in U.S. Appl. No. 16/897,565 mailed Jul. 6, 2022.
Non-Final Office Action issued in U.S. Appl. No. 17/839,909 mailed Oct. 26, 2022.
Notice of Allowance issued in U.S. Appl. No. 17/839,909 mailed Mar. 29, 2023.

* cited by examiner

FIG. 5

| DEVICE SERIAL NO.: abcd0101 | DIVIDING TRANSMISSION SCAN>EDIT OF BUTTON |
|---|---|
| APPLICATION MANAGEMENT | |

EDIT OF BUTTON   511   512
   [OK]  [CANCEL]

DETAILED INFORMATION OF BUTTON

BASIC SETTING
BUTTON NAME: 501 [MEDICAL INTERVIEW SHEET]

TRANSMISSION SETTINGS

FILE NAME: 502 [BUTTON NAME ▼]
503 [DATE]

TRANSMISSION DESTINATION: [\\FILE SERVER\MEDICAL INTERVIEW SHEET] 504 [SELECT FROM ADDRESS BOOK...]

ERROR-TIME TRANSMISSION DESTINATION: 505

TRANSMISSION DESTINATION FOLDER NAME SETTINGS [\\FILE SERVER\ERROR IMAGE\MEDICAL INTERVIEW SHEET] 506 [SELECT FROM ADDRESS BOOK...]

CHARACTER TYPE: 507 [ONLY NUMERALS ▼]
[ALPHANUMERIC CHARACTERS]
[AS DESIRED]

NUMBER OF CHARACTERS: 508 [5]  509 [OCR AREA DESIGNATION]

READING SETTINGS  510 [READING SETTINGS]

MEDICAL INTERVIEW SHEET

DATE OF INTERVIEW: JANUARY 23    ID [12345]
NAME: TARO YAMADA
INTERVIEWED AT: OTOLARYNGOLOGY

FIG. 10B

MEDICAL INTERVIEW SHEET

DATE OF INTERVIEW: JANUARY 23    ID [AAA]
NAME: TARO YAMADA
INTERVIEWED AT: OTOLARYNGOLOGY

FIG. 13

| DEVICE SERIAL NO.: abcd0101 | DIVIDING TRANSMISSION SCAN>EDIT OF BUTTON |
|---|---|
| APPLICATION MANAGEMENT | EDIT OF BUTTON |

DETAILED INFORMATION OF BUTTON

BASIC SETTING
BUTTON NAME: MEDICAL INTERVIEW SHEET

TRANSMISSION SETTINGS

FILE NAME: [BUTTON NAME ▼] [DATE]

TRANSMISSION DESTINATION: ¥¥FILE SERVER¥MEDICAL INTERVIEW SHEET  [SELECT FROM ADDRESS BOOK...]

ERROR-TIME TRANSMISSION DESTINATION: ¥¥FILE SERVER¥ERROR IMAGE¥MEDICAL INTERVIEW SHEET  [SELECT FROM ADDRESS BOOK...]

ERROR REPORT TRANSMISSION DESTINATION: abcde@fgi.co.jp — 1301  [SELECT FROM ADDRESS BOOK...]

TRANSMISSION DESTINATION FOLDER NAME SETTINGS

CHARACTER TYPE: [ONLY NUMERALS ▼] [ALPHANUMERIC CHARACTERS] [AS DESIRED]

NUMBER OF CHARACTERS: [5]

READING SETTINGS   [OCR AREA DESIGNATION]

[READING SETTINGS]

— 1302

[OK] [CANCEL]

| DEVICE SERIAL NO.: abcd0101 | DIVIDING TRANSMISSION SCAN>EDIT OF BUTTON | | | OK | CANCEL |
|---|---|---|---|---|---|
| APPLICATION MANAGEMENT | EDIT OF BUTTON | | | | |

DETAILED INFORMATION OF BUTTON

BASIC SETTING
BUTTON NAME: MEDICAL INTERVIEW SHEET
TRANSMISSION SETTINGS

FILE NAME: [BUTTON NAME ▼] [DATE]

TRANSMISSION DESTINATION: \\FILE SERVER\MEDICAL INTERVIEW SHEET [SELECT FROM ADDRESS BOOK...]

ERROR-TIME TRANSMISSION DESTINATION: \\FILE SERVER\ERROR IMAGE\"MEDICAL INTERVIEW SHEET" — 505 [SELECT FROM ADDRESS BOOK...]

DETAILED FOLDER: 1501 — [NOT CREATE ▼] [LOGIN USER NAME ▼] [DATE]

ERROR REPORT TRANSMISSION DESTINATION: abcde@fgi.co.jp [SELECT FROM ADDRESS BOOK...]

TRANSMISSION DESTINATION FOLDER NAME SETTINGS

CHARACTER TYPE: [ONLY NUMERALS ▼]
ALPHANUMERIC CHARACTERS AS DESIRED

NUMBER OF CHARACTERS: [5]

[OCR AREA DESIGNATION]

[READING SETTINGS]

[READING SETTINGS]

ID_PROCESSING SYSTEM ENABLING EASY CHECKING OF OCR ERROR IMAGE DATA, IMAGE FORMING APPARATUS, METHOD OF CONTROLLING IMAGE PROCESSING SYSTEM, METHOD OF CONTROLLING IMAGE FORMING APPARATUS, AND STORAGE MEDIUM

BACKGROUND OF THE INVENTION

Field of the Invention

The present invention relates to an image processing system, an image forming apparatus, a method of controlling the image processing system, a method of controlling the image forming apparatus, and a storage medium, which make it possible to easily check OCR error image data.

Description of the Related Art

Conventionally, there have been known an image processing system including an image forming apparatus and a file server. In the image processing system, the image forming apparatus reads a document to generate image data, and transmits the generated image data to the file server. The file server stores the image data received from the image forming apparatus in a shared folder provided therein and allowing viewing from a console section of the image forming apparatus. The file server manages image data of a plurality of types of documents different in the format, such as medical interview sheets and medical diagnosis sheets. In such a form of usage of the image processing system, with a view to improving the ease of search of image data by users, image data is subjected to a dividing process. In the dividing process, the image forming apparatus performs OCR (optical character recognition) processing on each generated image data in a predetermined area thereof from which the type of a document can be identified (see e.g. Japanese Laid-Open Patent Publication (Kokai) No. 2017-73591). The image forming apparatus sends the image data to the file server by designating a folder having a folder name including a character string obtained by the OCR processing, as a holder whether the image data is to be stored. The file server stores the image data in the designated folder. This enables management of image data by dividing them among folders associated with types of documents, respectively.

In the OCR processing, in a case where an OCR error has occurred in which no specific character string satisfying conditions for determining a designated folder can be obtained, image data in which the OCR error has occurred (hereinafter referred to as "OCR error image data") is stored in a predetermined error folder. The OCR error image data is stored in the error folder and is then transferred to a suitable folder by the user.

Conventionally, however, if image data of other irrelevant types are mixed with the OCR error image data in the error folder, it is necessary for the user to open each image data stored in the error folder and check the contents thereof so as to determine a folder where OCR error image data is to be transferred. This costs the user time and effort.

SUMMARY OF THE INVENTION

The present invention provides an image processing system, an image forming apparatus, a method of controlling the image processing system, a method of controlling the image forming apparatus, and a storage medium, which make it possible to reduce user time and effort in checking OCR error image data.

In a first aspect of the present invention, there is provided an image processing system that performs OCR processing on an image data generated by an image forming apparatus and stores, in response to selection of an object by a user, the image data in a folder having a folder name formed by using a character string obtained by the OCR processing, comprising a storage control unit configured to store the image data, in a case where the character string obtained by performing the OCR processing on the generated image data does not satisfy a predetermined condition, in a folder associated with the object.

In a second aspect of the present invention, there is provided an image forming apparatus that reads a document to thereby generate an image data, performs OCR processing on the image data, and stores, in response to selection of an object by a user, the image data in a folder having a folder name formed by using a character string obtained by the OCR processing, comprising a storage control unit configured to store the image data, in a case where the character string obtained by performing the OCR processing on the generated image data does not satisfy a predetermined condition, in a folder associated with the object.

In a third aspect of the present invention, there is provided a method of controlling an image processing system that performs OCR processing on an image data generated by an image forming apparatus and stores, in response to selection of an object by a user, the image data in a folder having a folder name formed by using a character string obtained by the OCR processing, comprising storing the image data, in a case where the character string obtained by performing the OCR processing on the generated image data does not satisfy a predetermined condition, in a folder associated with the object.

In a fourth aspect of the present invention, there is provided a method of controlling an image forming apparatus that reads a document to thereby generate an image data, performs OCR processing on the image data, and stores, in response to selection of an object by a user, the image data in a folder having a folder name formed by using a character string obtained by the OCR processing, comprising storing the image data, in a case where the character string obtained by performing the OCR processing on the generated image data does not satisfy a predetermined condition, in a folder associated with the object.

According to the present invention, it is possible to reduce user time and effort in checking OCR error image data.

Further features of the present invention will become apparent from the following description of exemplary embodiments (with reference to the attached drawings).

BRIEF DESCRIPTION OF THE DRAWINGS

FIG. 5 is a view showing an example of a settings edit screen displayed on a display section of a PC appearing in FIG. 1.

FIGS. 10A and 10B are views useful in explaining determination in a step S906 in FIG. 9.

FIG. 13 is a view showing another example of the settings edit screen displayed on the display section of the PC appearing in FIG. 1.

FIG. 15 is a view showing a still another example of the settings edit screen displayed on the display section of the PC appearing in FIG. 1.

DESCRIPTION OF THE EMBODIMENTS

The present invention will now be described in detail below with reference to the accompanying drawings showing embodiments thereof. It should be noted that the embodiment described hereafter does not limit the scope of the invention claimed in the appended claims and that not all of a combination of features of the embodiment are necessarily essential as means for the solution by the invention.

Figure 1:
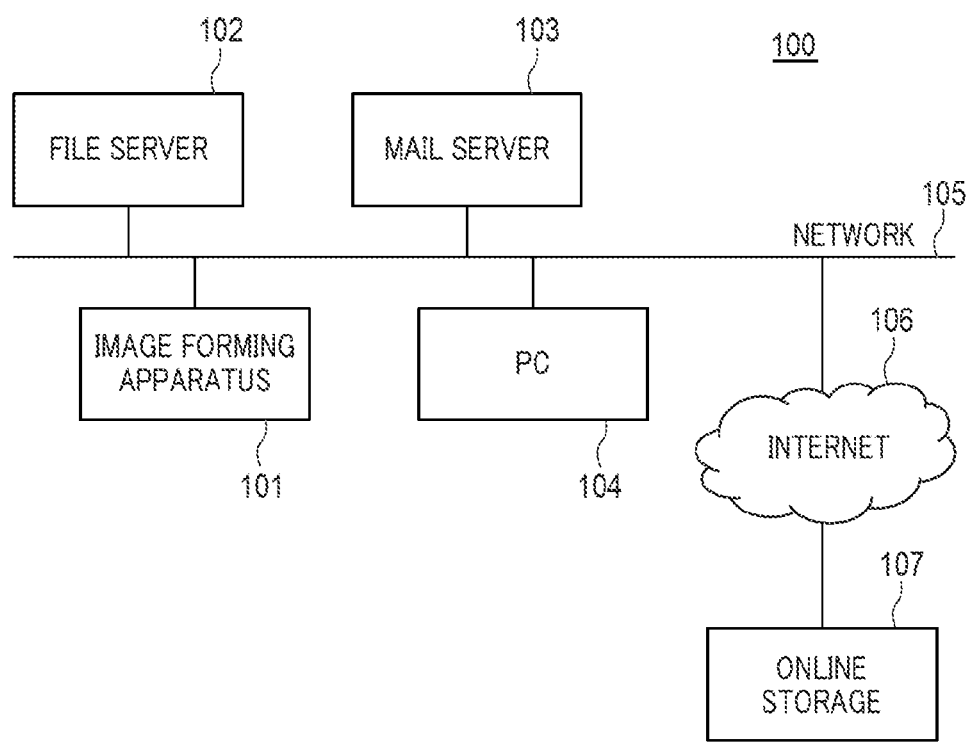
FIG. 1 is a schematic block diagram showing the configuration of an image processing system according to an embodiment of the present invention.

FIG. 1 is a schematic block diagram showing the configuration of an image processing system 100 according to the embodiment of the present invention. Referring to FIG. 1, the image processing system 100 is comprised of an image forming apparatus 101, a file server 102, a mail server 103, and a PC 104. The image forming apparatus 101, the file server 102, the mail server 103, and the PC 104 are communicably connected to each other via a network 105. The Internet 106 is connected to the network 105. Note that the network 105 may be configured such that the above-mentioned elements are connected thereto by wire or are wirelessly connected to an access point (not shown) thereof. The image forming apparatus 101 is communicable with an online storage 107 via the Internet 106.

The image forming apparatus 101 generates image data by reading a document, and transmits the image data to one of the file server 102, the mail server 103, and the online storage 107. The image data in the embodiment is electronic data formed by converting an image into RAW data, electronic data in TIFF format, JPEG format, or the like image format, or electronic data in PDF format. The file server 102 is compliant with FTP and SMB protocols, and stores image data received from the image forming apparatus 101 in folders provided in the file server 102. The user can view the image data in the folders from a console section 206, referred to hereinafter with reference to FIG. 2, or a display section (not shown) of the PC 104. The mail server 103 is compliant with SMTP protocol. HTTP protocol makes it possible to view or update settings of the image forming apparatus 101 from the PC 104. The online storage 107 is compliant with WebDAV which is a file sharing protocol using HTTP protocol.

Figure 2:
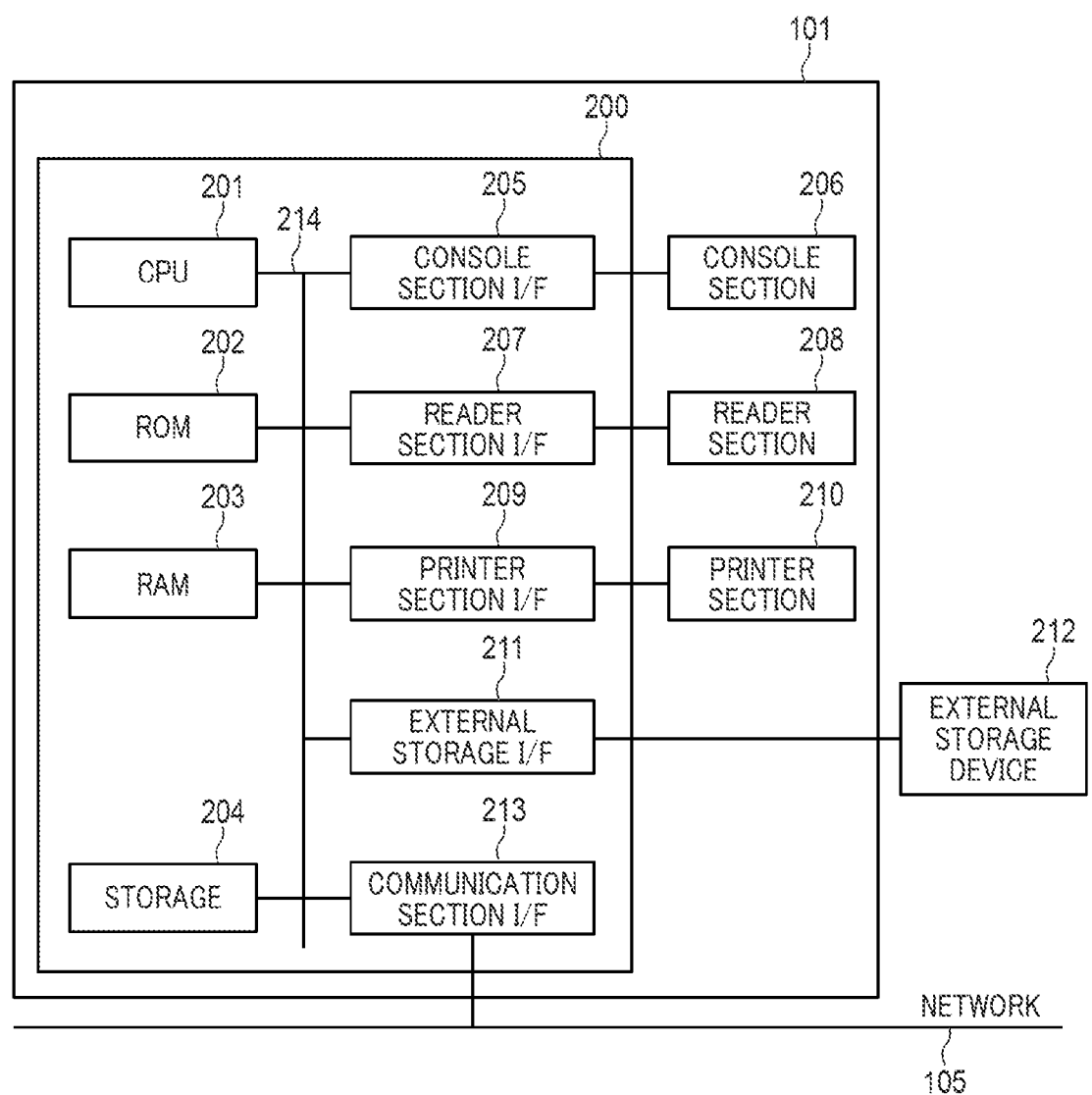
FIG. 2 is a schematic block diagram showing the configuration of an image forming apparatus appearing in FIG. 1.

FIG. 2 is a schematic block diagram showing the configuration of the image forming apparatus 101 appearing in FIG. 1. Referring to FIG. 2, the image forming apparatus is comprised of a controller 200, the console section 206, a reader section 208, and a printer section 210. The controller 200 is connected to the console section 206, the reader section 208, and the printer section 210. Further, the controller 200 is comprised of a CPU 201, a ROM 202, a RAM 203, a storage 204, a console section interface 205, a reader section interface 207, a printer section interface 209, an external storage interface 211, and a communication section interface 213. The CPU, the ROM 202, the RAM 203, the storage 204, the console section interface 205, the reader section interface 207, the printer section interface 209, the external storage interface 211, and the communication section interface 213 are connected to each other via a bus 214.

The controller 200 controls the overall operation of the image forming apparatus 101. The CPU 201 reads control programs stored in the ROM 202 or the storage 204 to perform various controls, such as reading control and printing control. The ROM 202 stores the control programs executed by the CPU 201. The ROM 202 also stores a boot program, font data, etc. The RAM 203 is a main memory of the CPU 201. The RAM 203 is used as a work area for the CPU 201, and also as a temporary storage area for loading the control programs stored in the ROM 202 and the storage 204.

The storage 204 stores image data, print data, address book data, programs, and settings data. Although in the embodiment, the storage 204 is assumed to be a flash memory, this is not limitative, but the it may be an SSD, an HDD, an eMMC or a like other auxiliary storage. Note that the image forming apparatus 101 is assumed to be configured such that one CPU 201 performs processes, described hereinafter, using one RAM 203, but may be otherwise configured. For example, a plurality of CPUS, RAMs, ROMs and storages may be caused to cooperate to execute the processes described hereinafter. Further, a hardware circuit, such as an ASIC (Application Specific Integrated Circuit) or an FPGA (Field-Programmable Gate Array), may be used to partially execute the processes.

The console section interface 205 connects the console section 206 and the controller 200. The console section 206 displays information to the user and receives an instruction input by the user e.g. for executing a job. The reader section interface 207 connects the reader section 208 and the controller 200. The reader section 208 reads an image on a document and converts the image to image data of e.g. binary data. The image data generated by the reader section 208 is transmitted to the external storage device 212 for storage, or printed on a sheet. The printer section interface 209 connects the printer section 210 and the controller 200. The printer section interface 209 acquires image data as an object to be printed from the CPU 201 and transfers the acquired image data to the printer section 210. The printer section 210 prints an image on a sheet fed from a sheet feeder cassette (not shown).

The external storage interface 211 connects the external storage device 212 and the controller 200. The external storage interface 211 acquires image data from the CPU 201 and stores the acquired image data in the external storage device 212. Although in the present embodiment, the external storage device 212 is assumed to be a USB memory, this is not limitative, but it may be an SD card or the like. The communication section interface 213 performs data communication with an external device connected via the network 105. For example, the communication section interface 213 transmits E-mails to the mail server 103. Further, the communication section interface 213 transmits image data to the filer server 102 and the online storage server 107. For transmission of the image data, FTP, SMP, WebDAV, SMTP, or like other protocol is used. The communication section interface 213 transmits information on various settings of the image forming apparatus 101 to the PC 104. Further, the communication section interface 213 receives a request for referring to or changing settings of the image forming apparatus 101 using a Web server application (not shown) from the PC 104.

Figure 3:
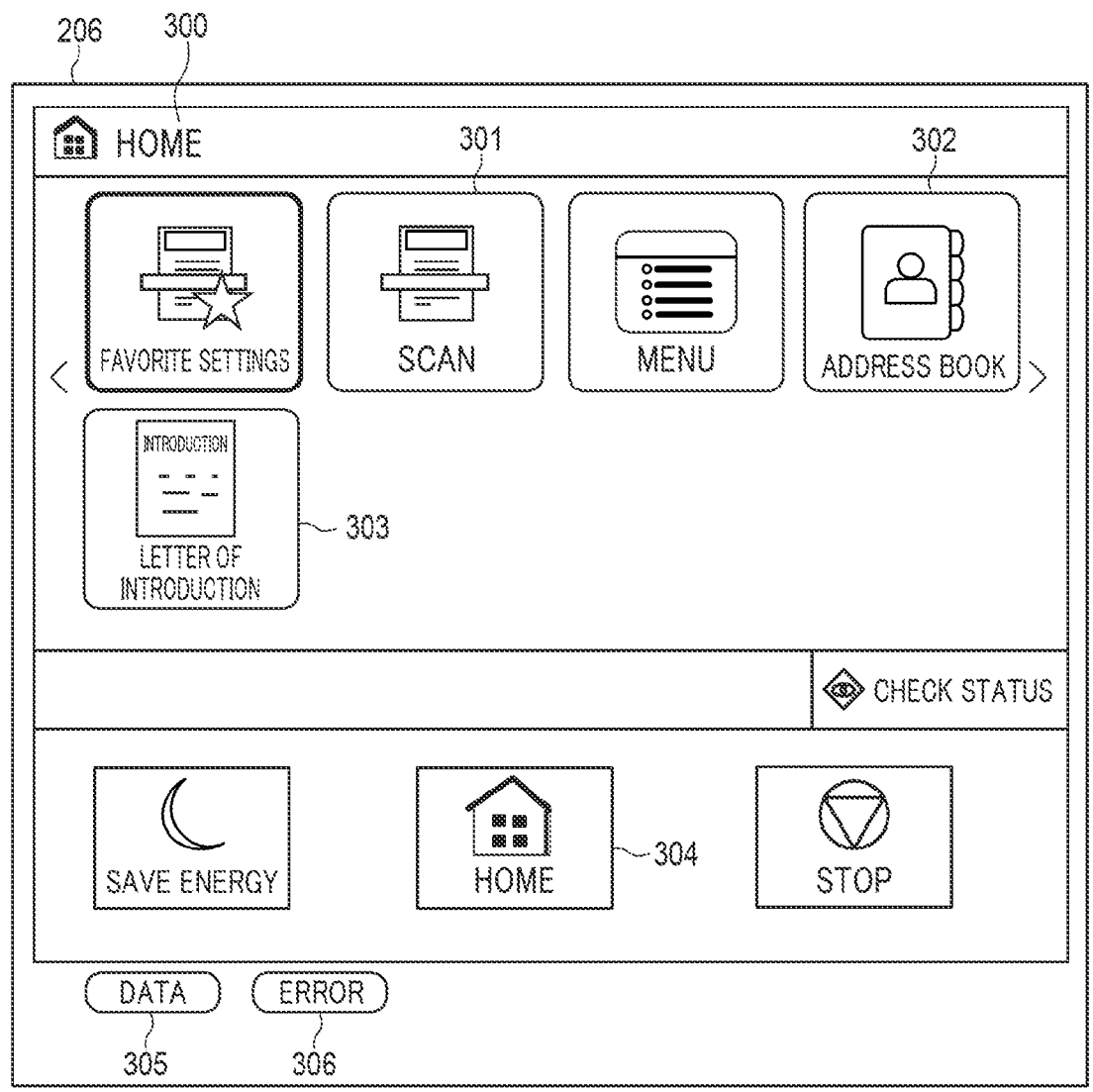
FIG. 3 is a view showing the appearance of a console section appearing in FIG. 2.

FIG. 3 is a view showing the appearance of the console section 206 appearing in FIG. 2. The console section 206 is formed by a touch-panel display. Further, the console section 206 includes a data LED 305 and an error LED 306. The console section 206 displays various types of screens. For example, when the image forming apparatus 101 is started up, the console section 206 displays a home screen 300. The home screen 300 is a screen for prompting the user to select a function desired to use. The home screen 300 displays a scan button 301, an address book button 302, a letter-of-introduction button 303, a home button 304, etc. which are associated with functions of the image forming apparatus 101, respectively.

The scan button 301 is used for giving an instruction for reading a document to generate image data, to the image forming apparatus 101. The address book button 302 is used for giving an instruction for displaying an address book management screen (not shown), to the image forming apparatus 101. On the address book management screen, destination information of a destination to which image data is to be transmitted is set. The destination information includes transmission type information indicating a transmission type, such as E-mail transmission, SMB transmission, FTP transmission, and WebDAV transmission, address-related information, such as an E-mail server, a host name, and a server name, etc.

The letter-of-introduction button 303 is a dividing transmission button. The dividing transmission button is used for giving an instruction for executing a dividing scan process, to the image forming apparatus. In the dividing scan process, the image forming apparatus 101 reads a document to generate image data, performs OCR processing on the generated image data in an OCR area thereof, referred to hereinafter, and transmits the image data to a folder having a folder name of a character string obtained by the OCR processing. The home button 304 is used for giving an instruction for displaying the home screen 300 on the console section 206, to the image forming apparatus 101, and is always displayed on the console section 206. The data LED 305 and the error LED 306 notifies the user of a status of the image forming apparatus 101. The data LED 305 is lit from the start of execution of an E-mail transmission job or a file transmission job to the end thereof. The error LED 306 is lit when an error has occurred in the image forming apparatus 101.

Figure 4:
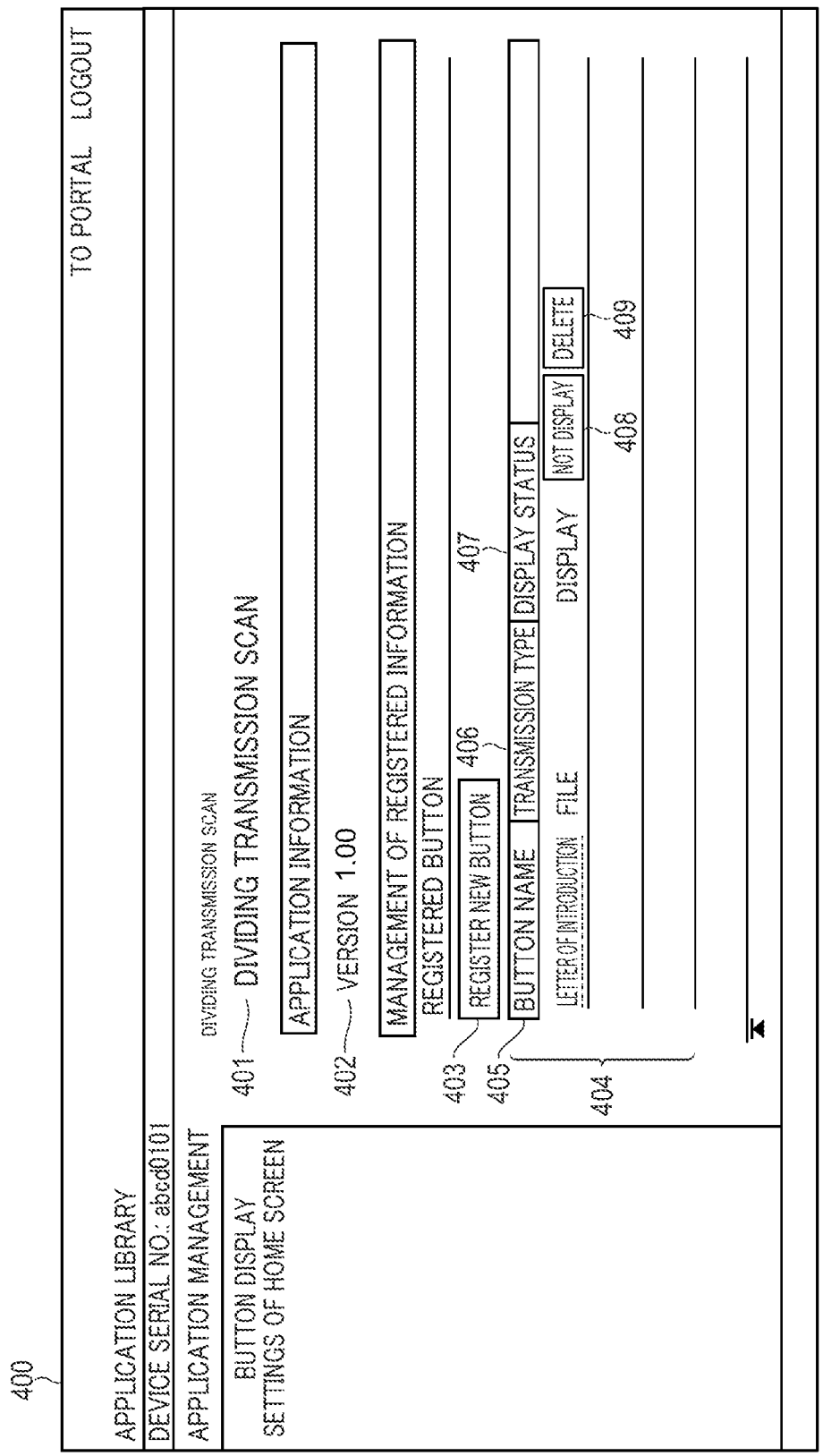
FIG. 4 is a view showing an example of a management screen for registering a dividing transmission button to be included in a home screen appearing in FIG. 3.

Next, settings of the dividing transmission button will be described. FIG. 4 is a view showing an example of a management screen 400 for registering a dividing transmission button included in the home screen 300 appearing in FIG. 3. The management screen 400 is displayed on the display section of the PC 104 when the PC 104 is connected by HTTP to the image forming apparatus 101 via a browser. The management screen 400 includes an application name area 401, an application information area 402, a new registration button 403, and a button information area 404. On the management screen 400, the user can view information on dividing transmission buttons already registered.

The application name area 401 displays the name of an application program (dividing transmission scan application program) which is invoked when a dividing transmission button associated therewith is depressed. In FIG. 4, the application name area 401 displays the name "dividing transmission scan". The application information area 402 displays a version of the dividing transmission scan application program. In FIG. 4, the application information area 402 displays a version number of 1.00. The new registration button 403 is a button for newly creating a dividing transmission button. When the user selects the new registration button 403, a settings edit screen 500, described hereinafter with reference to FIG. 5, is displayed on the display section of the PC 104.

The button information area 404 displays information on dividing transmission buttons already registered. The button information area 404 displays the items of a button name 405, a transmission type 406, and a display status 407, a switching button 408, and a delete button 409. Under the item of the button name 405, there is displayed the name of the registered dividing transmission button. When the user selects a character string displayed as the name of the registered dividing transmission button, the settings edit screen 500 in FIG. 5 is displayed on the display section of the PC 104, in a state in which settings associated with the character string are set therein. Under the item of the transmission type 406, there is displayed a transmission type, such as "file transmission", which is set for the registered dividing transmission button. Under the item of the display status 407, there is displayed information on whether the registered dividing transmission button is to be displayed on the console section 206. A dividing transmission button for which "display" is displayed as the display status 407 is displayed on the console section 206, whereas a dividing transmission button for which "not display" is displayed as the display status 407 is not displayed on the console section 206. The switching button 408 is a toggle switch for switching the display status 407 between "display" and "not display". The delete button 409 is used for deleting the information registered for the dividing transmission button.

FIG. 5 is a view showing an example of the settings edit screen 500 displayed on the display section of the PC 104 appearing in FIG. 1. Referring to FIG. 5, the settings edit screen 500 (reception unit) includes an input field 501, a pull-down list box 502, a transmission destination area 503, a selection button 504, an error-time transmission destination area 505, and a selection button 506. The settings edit screen 500 further includes a pull-down list box 507, an input field 508, an OCR area designation button 509, a reading settings button 510, an OK button 511, and a cancel button 512. The settings edit screen 500 receives a request for setting settings associated with a dividing transmission button.

The input field 501 is an edit box for setting the name of a dividing transmission button. The pull-down list box 502 is a list box for selecting the method of naming image data. From the pull-down list box 502, the user can select one of "button name" and "date". In a case where the user selects "button name", the name set in the input field 501 is reflected on the data name of the image data. In a case where the user selects "date", a date on which a document was read is reflected on the data name of the image data.

Figure 6:
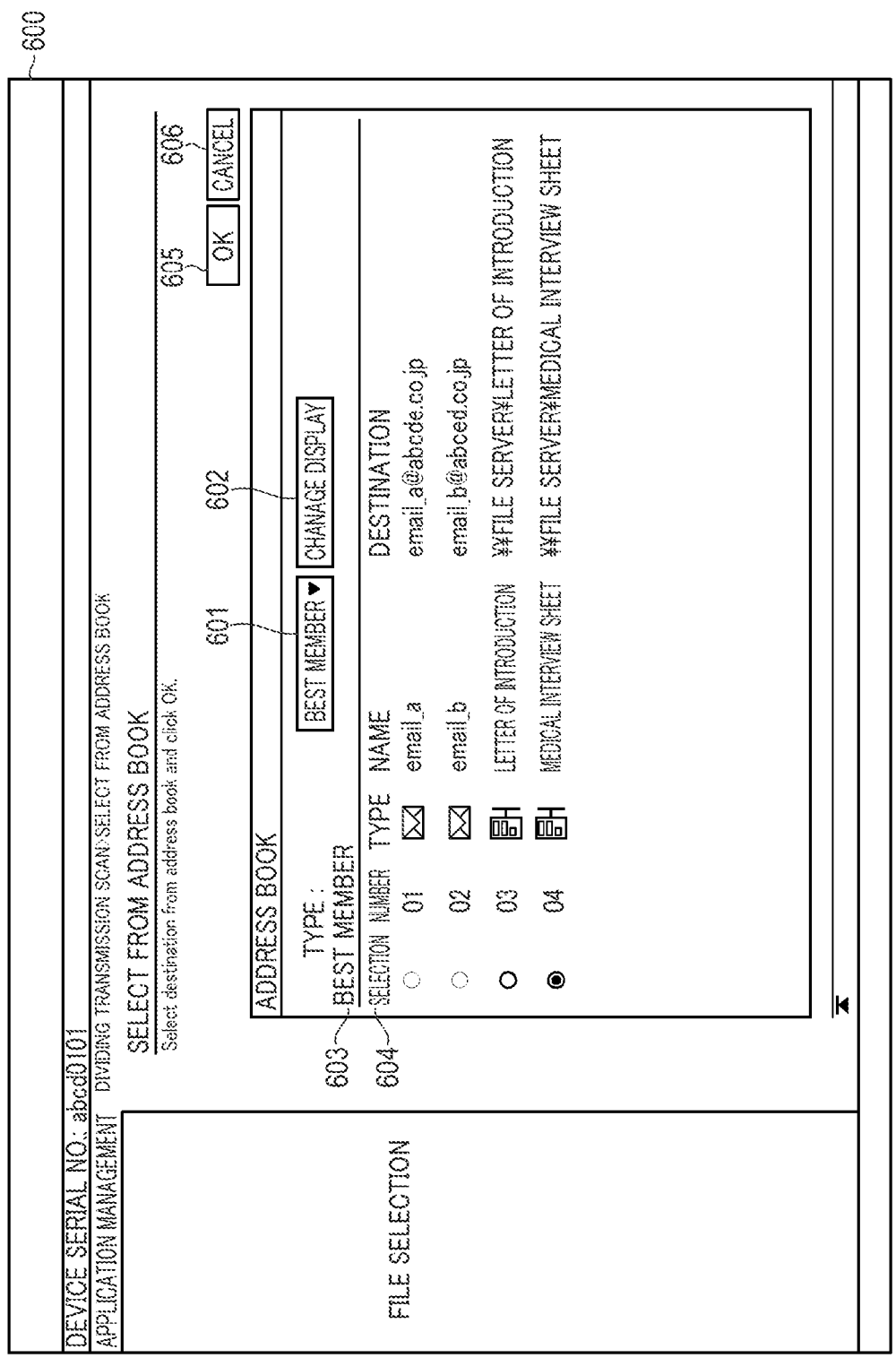
FIG. 6 is a view showing an example of an address selection screen displayed on the display section of the PC appearing in FIG. 1.

In the transmission destination area 503, there is set a setting of a storage location of image data generated in accordance with depression of the dividing transmission button. The transmission destination area 503 is an editable text display area. The transmission destination area 503 displays a folder path which is entered or a folder path indicating a storage location selected via the selection button 504. The selection button 504 is used for setting a folder serving as a storage location of image data, from an address book of the image forming apparatus 101. When the user selects the selection button 504, an address selection screen 600, described hereinafter with reference to FIG. 6, is displayed on the display section of the PC 104.

In the error-time destination area 505, there is set a setting of a storage location of OCR error image data, which is image data with which an OCR error occurred in the OCR processing. The error-time destination area 505 is an editable text display area. The error-time destination area 505 displays a folder path which is entered or a folder path indicating a storage location selected via the selection button 506. The selection button 506 is used for setting a folder serving as a storage location of OCR error image data, from the address book of the image forming apparatus 101. When the user selects the selection button 506, the address selection screen 600 in FIG. 6 is displayed on the display section of the PC 104.

The pull-down list box 507 is an object for setting a predetermined condition for determining a storage location from a character string obtained by the OCR processing, specifically, a type of the character string. The user can select, from the pull-down list box, one of "only numerals" and "alphanumeric characters". In the present embodiment, image data from which no character string satisfying the condition indicated by the setting of the pull-down list box 507 cannot be acquired by the OCR processing on an OCR area designated by the OCR area designation button 509 is treated as OCR error image data. The input field 508 is an object for setting a predetermined condition for determining a storage location from a character string obtained by the OCR processing, specifically, an upper limit of the number of characters. The maximum number which can be set in the input field 508 is e.g. "16". In the present embodiment, image data from which a character string of characters exceeding in number the setting of the input field 508 is obtained by the OCR processing on the OCR area designated by the OCR area designation button 509 is also treated as OCR error image data.

The OCR area designation button 509 is used for designating an OCR area in image data where the OCR processing is to be performed. When the user selects the OCR area designation button 509, it is possible to designate a rectangular area indicating an OCR area. The reading settings button 510 is used for setting scan settings. When the user selects the reading settings button 510, a detailed settings screen (not shown) concerning a scan function is displayed on the display section of the PC 104.

The OK button 511 is used for finalizing the settings in the settings edit screen 500. When the user selects the OK button 511, the settings in the settings edit screen 500 are stored in the storage 504 as dividing scan settings data. The cancel button 512 is used for canceling the settings in the settings edit screen 500. When the user selects the OK button 511 or the cancel button 512, the settings edit screen 500 displayed on the display section of the PC 104 is switched to the management screen 400.

FIG. 6 is a view showing an example of the address selection screen 600 displayed on the display section of the PC 104 appearing in FIG. 1. The address selection screen 600 includes a pull-down list box 601, a display switching button 602, an area 603, a list 604, an OK button 605, and a cancel button 606.

The pull-down list box 601 is used for switching a type of an address book to be displayed on the address selection screen 600. The pull-down list box 601 enables the user to select one of "best member" and "abbreviated dial" (not shown). The display switching button 602 is used for giving an instruction for changing the type of an address book to be displayed on the address selection screen 600 to a type selected from the pull-down list box 601, to the image forming apparatus 101.

The area 603 displays the name of the address book. The list 604 displays an address list formed by the elements of selection, a number, a type, a name, and a destination. For the selection, there is displayed one of an active checkbox and a disactivated check box. For the number, a management number is displayed. For the type, an icon is displayed which varies with the type of an address. For the name, a name assigned to an address is displayed. For the destination, the address is displayed.

The description of display of an active checkbox and a disactivated check box is supplemented. FIG. 6 shows an example of the display for selecting an address from the address book of "best member" in which two addresses of "E mail" and two addresses of "file" are registered, in a state in which "file transmission" is set as the transmission type 406 of the management screen 400 in FIG. 4. Thus, in the address selection screen 600, destinations compatible with the set transmission type are selectively displayed. Specifically, an active checkbox is displayed for each of destinations assigned with the number "03" and the number "04", which are compatible with the set transmission type. On the other hand, for each of destinations assigned with the number "01" and the number "02", which are not compatible with the set transmission type, a disactivated checkbox is displayed. The OK button 605 is used for finalizing the settings in the address selection screen 600. The cancel button 606 is used for canceling the settings in the address selection screen 600. When the user selects the OK button 605 or the cancel button 606, the address selection screen 600 displayed on the display section of the PC 104 is switched to the settings edit screen 500. In the transmission destination area 503 (or the error-time transmission destination area 505) of the settings edit screen 500 to which the address selection screen 600 is switched, the folder path corresponding to the settings in the address selection screen 600 is displayed.

Figure 7:
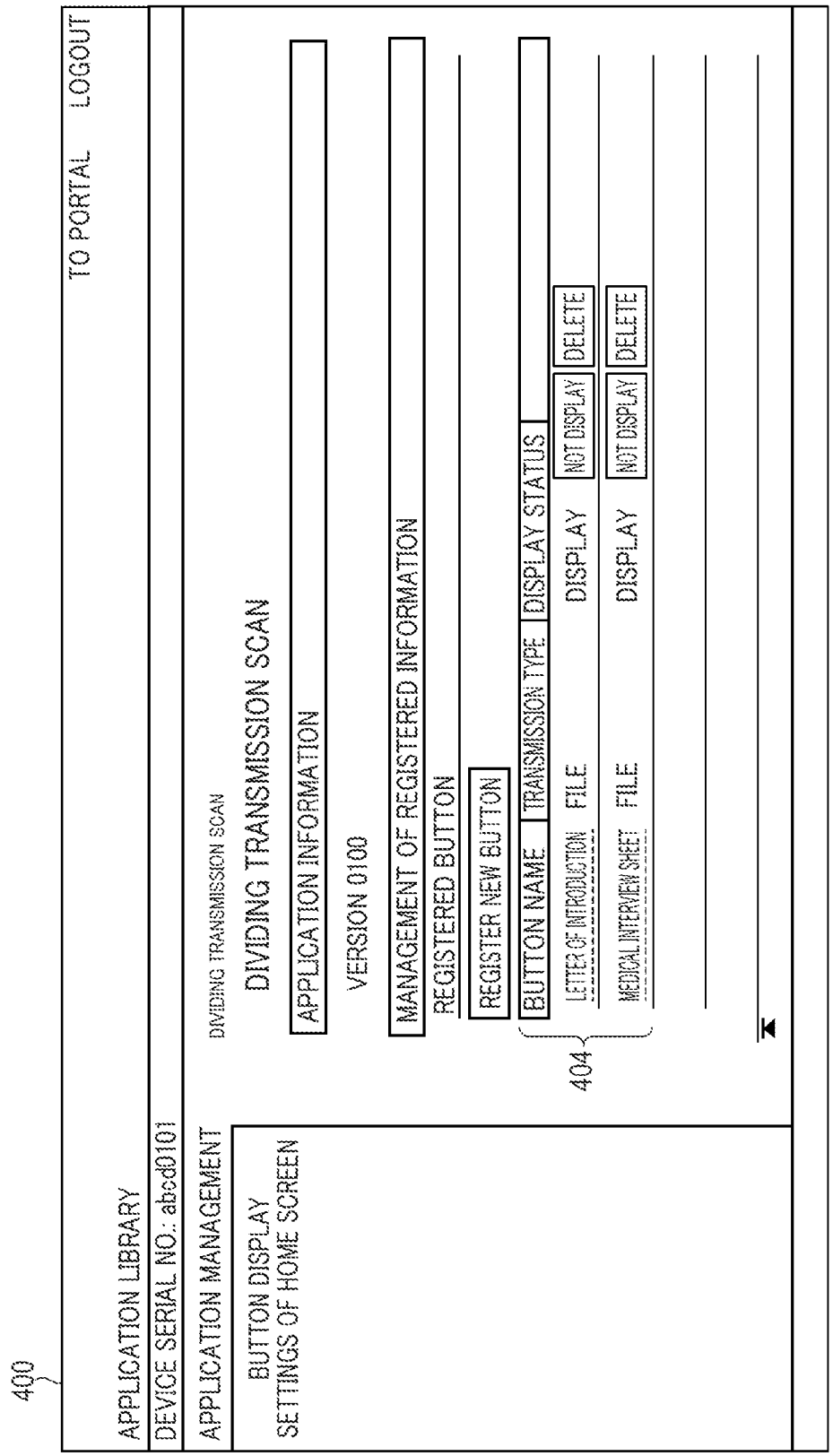
FIG. 7 is a view showing an example of display of the management screen to which information on a medical interview sheet button has been added.
Figure 8:
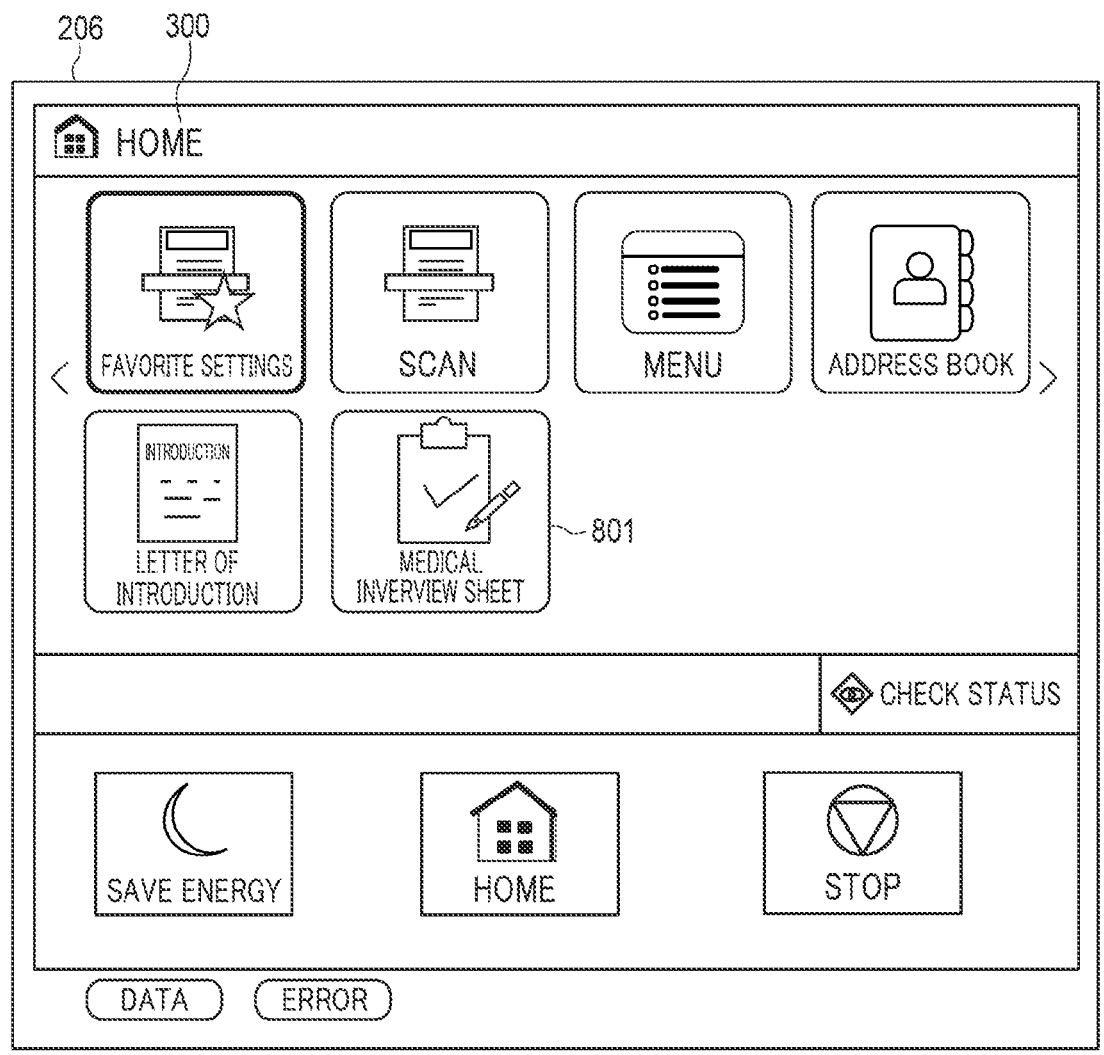
FIG. 8 is a view showing an example of display of the home screen to which the medical interview sheet button has been added.

To set a dividing transmission button, assuming, for example, that the user selects the OK button 511 on the settings edit screen 500 in which settings concerning a dividing transmission button having the name of "medical interview sheet" are set as shown in FIG. 5, the settings edit screen 500 displayed on the display section of the PC 104 is switched to the management screen 400. As shown in FIG. 7, in the button information area 404 of the management screen 400 to which the settings edit screen 500 is switched, information concerning the dividing transmission button having the name of "medical interview sheet" is added. Further, as shown in FIG. 8, in the home screen 300 displayed on the console section 206 of the image forming apparatus 101, a medical interview sheet 801 (object), which corresponds to the information added to the button information area 404, is added. When the use depresses the medical interview button 801 on the home screen 300, the image forming apparatus 101 performs the dividing scan process shown in FIG. 9 based on the dividing scan settings data associated with the medical interview button 801.

Figure 9:
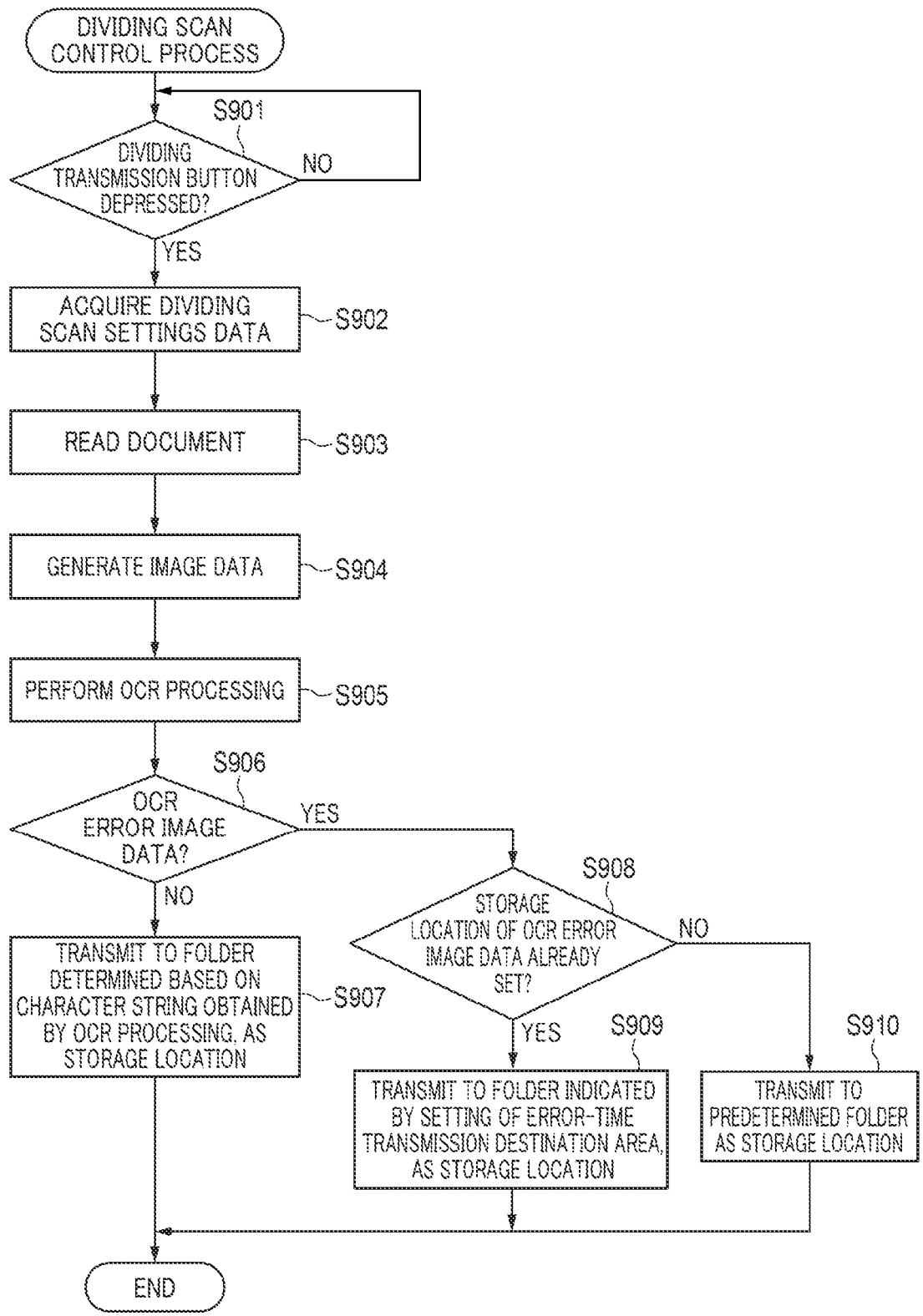
FIG. 9 is a flowchart of a dividing scan control process performed by the image forming apparatus appearing in FIG. 1.

FIG. 9 is a flowchart of the dividing scan control process performed by the image forming apparatus 101 appearing in FIG. 1. The dividing scan control process in FIG. 9 is realized by the CPU 201 executing a program loaded from the ROM 202 or the storage 204 into the RAM 203. The dividing scan control process is executed when the user depresses a dividing transmission button displayed on the home screen 300. In the present embodiment, it is assumed that folders where image data is to be stored are provided in the file server 102.

Referring to FIG. 9, when the CPU 201 detects depression of a dividing scan transmission button on the home screen 300, e.g. depression of the medical interview button 801 (YES to the step S901), the CPU 201 acquires dividing scan settings data of the medical interview button 801 (step S902). The dividing scan settings data of the medical interview button 801 includes a plurality of settings concerning the medical interview button 801 set on the settings edit screen 500. Then, the CPU 201 controls the reader section 208 to read a document placed thereon (step S903) and thereby generate image data of the document (step S904). Then, the CPU 201 performs OCR processing on the generated image data (step S905). In the step S905, the CPU 201 performs the OCR processing, for example, an OCR area 1002, which is set in advance on the settings read screen 500, of image data 1001 shown in FIG. 10A. In an example shown in FIG. 10A, a five-character string "12345", which is formed only by five numerals. Then, the CPU 201 determines, based on the character string obtained by the OCR processing, whether or not the image data generated in the step S904 is OCR error image data (step S906). Specifically, the determination in the step S906 is performed by determining whether the character string obtained by the OCR processing satisfies conditions indicated by the settings of the pull-down list box 507 and the input field 508, included in the dividing scan settings data, e.g. conditions that the character string is formed by only numerals and that the number of characters of the character string is within the upper limit of 5. For example, in a case where the image data 1001 shown in FIG. 10A is generated in the step S904, the character string "12345" is obtained from the OCR area 1002 of the image data 1001 in the step S905. The character string "12345" satisfies the conditions that the character string is formed by only numerals and that the number of characters of the character string is within the upper limit of 5, the CPU 201 determines that the image data generated in the step 904 is not OCR error image data. On the other hand, in a case where image data 1003 shown in FIG. 10B is generated in the step S904, the character string "AAA" is obtained from an OCR area 1004 of the image data 1003 in the step S905. The character string "AAA" does not satisfy the conditions that the character string is formed by only numerals and that the number of characters of the character string is within the upper limit of 5, the CPU 201 determines that the image data generated in the step 904 is OCR error image data.

Figure 11:
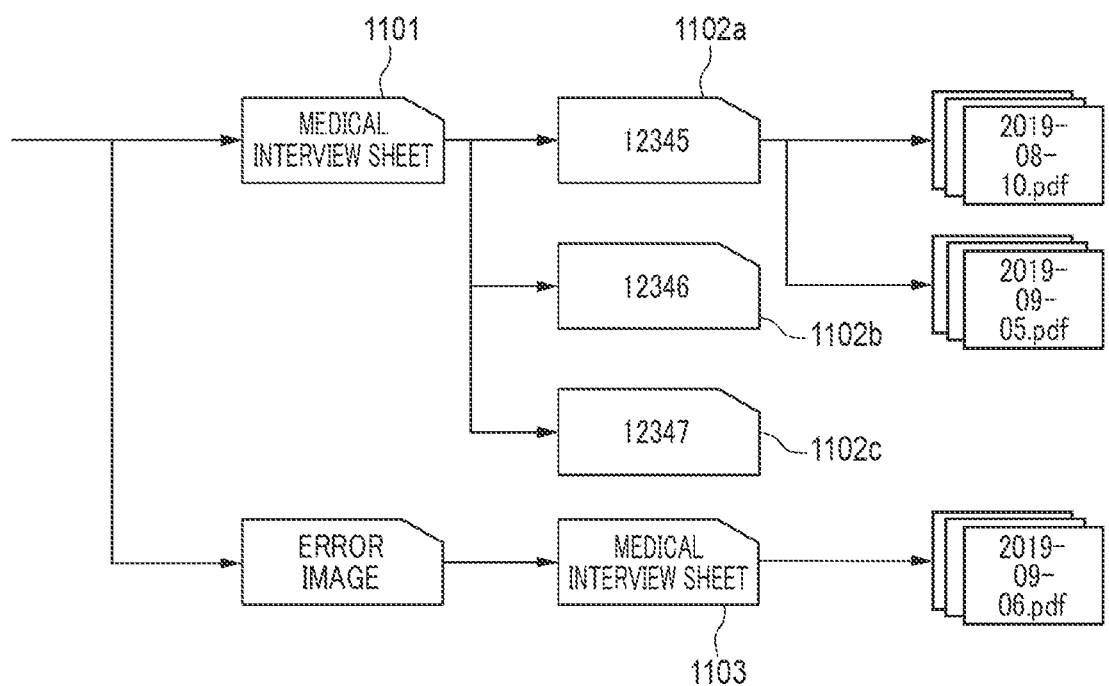
FIG. 11 is a diagram useful in explaining a storage destination where image data obtained by the dividing scan control process in FIG. 9 is stored.
Figure 12A:
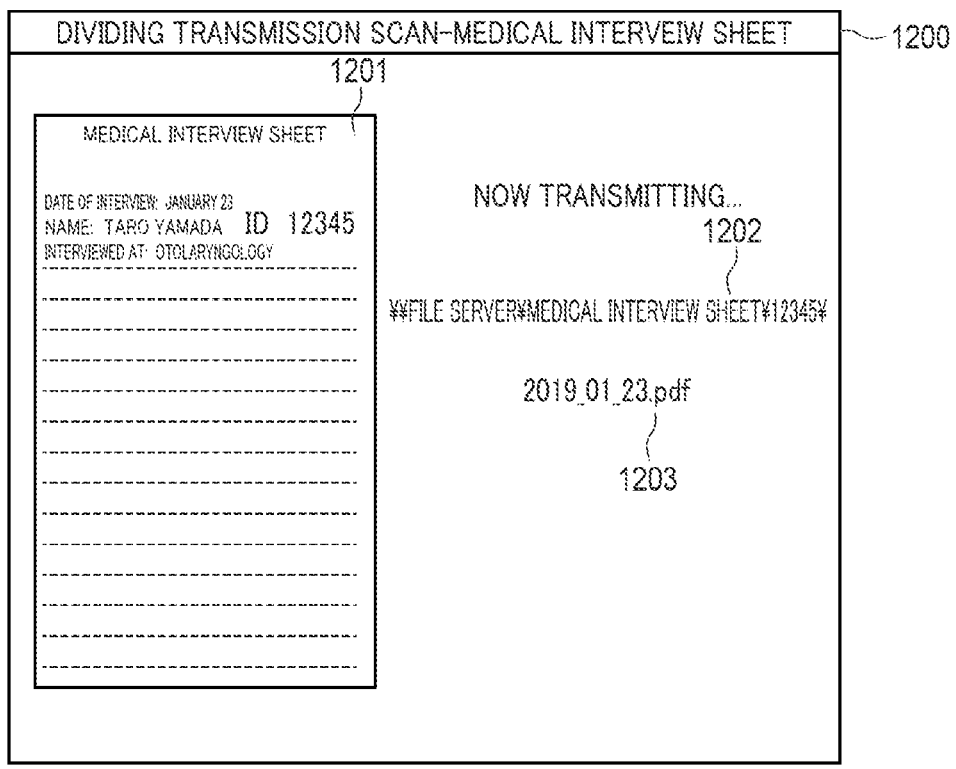
FIGS. 12A and 12B are views showing examples of a notification screen displayed on the console section appearing in FIG. 2.

If it is determined that the image data generated in the step 904 is not OCR error image data, the CPU 201 transmits the image data to the file server 102. Specifically, the CPU 201 sets a folder determined based on the dividing scan settings data and the character string obtained by the OCR processing, as the storage location, and transmits the image data to the folder (step S907). For example, the CPU 201 transmits the image data to the file server 102 so as to store the image data in one of folders 1102a to 1102c, appearing in FIG. 11, which are subordinate to the folder 1101 indicated by the setting of the transmission destination area 503 included in the dividing scan settings data, i.e. a folder 1102a having the folder name of "12345" which is a character string obtained by the OCR processing. While the image data is being transmitted in the step S907, a notification screen 1200 shown in FIG. 12A is displayed on the console section 206. The notification screen 1200 includes a preview image 1201, a folder path 1202, and a data name 1203. The preview image 1201 is a RAW image for liquid crystal display, which is converted from read image data of a document. The folder path 1202 indicates a storage location of the image data. In FIG. 12A, as the folder path 1202, there is displayed a folder path having a name formed by combining the setting "¥¥file server¥medical interview sheet" of the transmission destination area 503 included in the dividing scan settings data and "12345" which is a character string obtained from the OCR area. The data name 1203 is a data name of the image data. When the transmission of the image data is completed, the CPU 201 closes the notification screen 1200 and terminates the present process.

If it is determined in the step S906 that the image data generated in the step 904 is OCR error image data, the CPU 201 determines whether there has already been set a storage location of the OCR error data item (step S908). In the step S908, for example, if the dividing scan settings data includes a setting of the error-time transmission area 505, the CPU 201 determines that there has already been set a storage location of the OCR error image data. On the other hand, if the dividing scan settings data includes no setting of the error-time transmission area 505, the CPU 201 determines that there has been set no storage location of the OCR error image data.

Figure 12B:
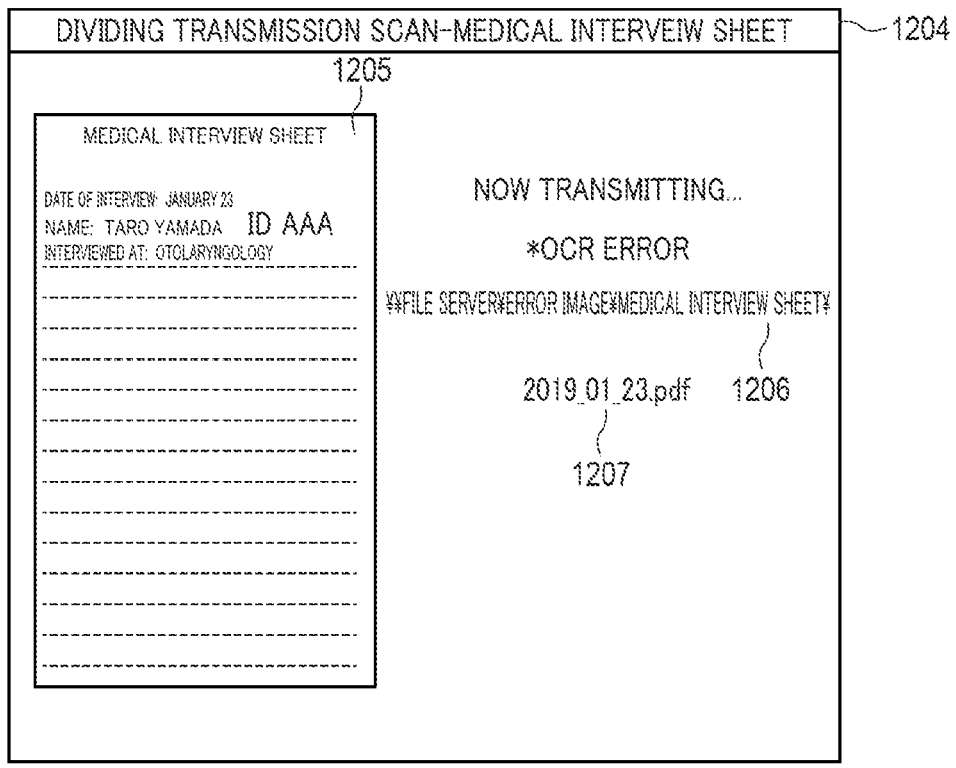

If it is determined in the step S908 that there has already been set a storage location of the OCR error image data, the CPU 201 transmits the image data to the file server 102. Specifically, the CPU 201 transmits image data to the file server 102 so as to store the image data in a storage location which is a folder indicated by the setting of the error-time transmission area 505 included in the dividing scan settings data (step S909) (operation of a storage control unit). In the step S909, for example, the CPU 201 transmits the image data to the filer server 102 so as to store the image data a folder 1103 appearing in FIG. 11, as the storage location indicated by the setting of the error-time transmission area 505 included in the dividing scan settings data. While the image data is being transmitted, a notification screen 1204 shown in FIG. 12B is displayed on the console section 206. The notification screen 1204 includes a preview screen 1205, a folder path 1206, and a data name 1207. The preview image 1205 is a RAW image for liquid crystal display, which is converted from read image data of a document. The folder path 1206 is a storage location of the image data transmitted in the step S909. In FIG. 12B, as the folder path 1206, there is displayed a folder path having a name formed by the setting "¥¥file server¥error imaga¥medical interview sheet" of the error-time transmission destination area 505 included in the dividing scan settings data. The data name 1207 is a data name of the image data. When the transmission of the image data is completed, the CPU 201 closes the notification screen 1204, followed by terminating the present process.

If it is determined in the S908 that there has been set no storage location of OCR error image data, the CPU 201 transmits the image data to the file server 102 so as to store the image data in a storage location which is set to a designated folder different from the folder designated in the step S909 (step S910), followed by terminating the present process. The file server 102 having received the image data stores the image data in the designated folder. As described above, the file server 102 stores, for example, image data which is not OCR error image data in one of the folder 1102a to 1102c subordinate to the folder 1101 designated by the setting of the transmission destination area 503 included in the dividing scan settings data, i.e. the folder 1102a having a folder name of "12345" which is the character string obtained by OCR processing. Further, the file server 102 stores OCR error image data in the folder 1103 indicated by the setting of the error-time transmission destination area 505 included in the dividing scan settings data. If the designated folder does not exist, the filer server 102 creates a designated folder and stores the image data in the designated folder.

According to the embodiment described above, in a case where image data generated according to depression of the medical interview button 801 is OCR error image data, the image data is stored in a folder indicated by the setting of the error-time transmission destination area 505 included in the dividing scan settings data of the medical interview button 801. In other words, a different folder is set as a storage location of OCR error image data, on a dividing transmission button basis. This makes it possible to put OCR error image data in order, by dividing them between respective folders associated with dividing transmission buttons, which makes it possible to reduce user time and effort in checking OCR error image data.

Further, in the embodiment described above, the folder indicated by the setting of the error-time transmission destination area 505 included in the dividing scan settings data is provided in the file server 102. This makes it possible to reduce user time and effort in checking OCR error image data, in an environment in which OCR error image data is stored in the filer 102.

Although the present invention has been described heretofore based on the embodiment, the invention is by no means limited to the embodiment described above. For example, the management screen 400, the settings edit screen 500, and the address selection screen 600 may be displayed on the console section 206 of the image forming apparatus 101.

Further, in the above-described embodiment, in a case where the image data generated in the step S904 is an OCR error data item, an error notification notifying the user of details of an error may be transmitted.

FIG. 13 is a view showing another example of the settings edit screen, denoted by reference numeral 1300, which is displayed on the display section of the PC 104 appearing in FIG. 1. The settings edit screen 1300 includes, in addition to the items of the settings edit screen 500, an error notification transmission destination area 1301 and a selection button 1302. In the error notification transmission destination area 1301, there is set a setting of a transmission destination (notification destination) of an error notification in a case where image data generated in the step S904 is OCR error image data. In the error notification transmission destination area 1301, there is displayed an entered E-mail address or an E-mail address selected via the selection button 1302, which indicates a transmission destination. The selection button 1302 is used for setting an E-mail address indicating the transmission destination of an error notification, by selection from the address book of the image forming apparatus 101. When the user selects the selection button 1302, the address selection screen 600 shown in FIG. 6 is displayed on the PC 104.

Figure 14:
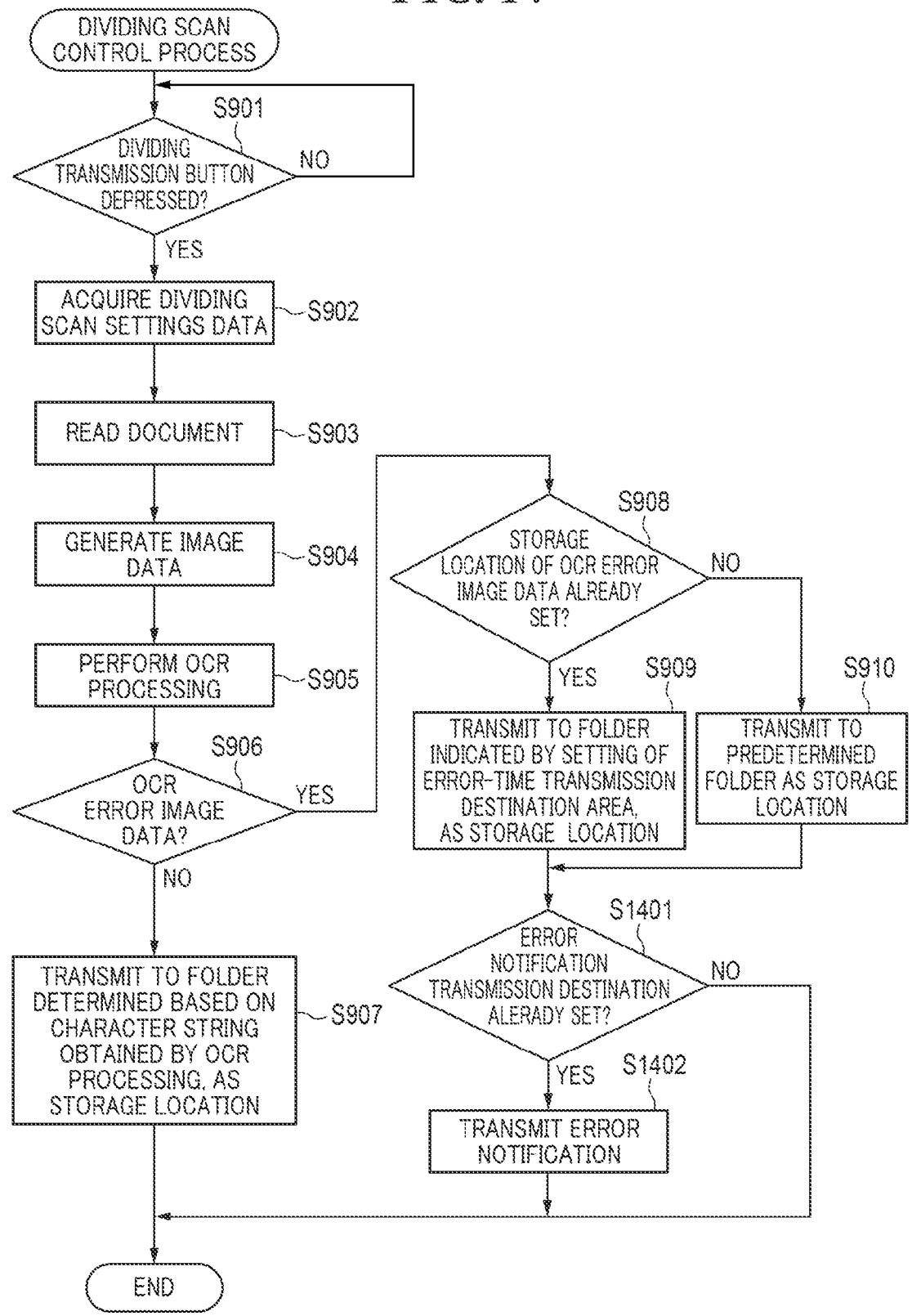
FIG. 14 is a flowchart showing a variation of the dividing scan control process in FIG. 9.

FIG. 14 is a flowchart of a variation of the dividing scan control process shown in FIG. 9, which is performed in a case where a dividing transmission button, which is depressed, was set using the settings edit screen 1300. The dividing scan control process shown in FIG. 14 as well is executed by the CPU 201 loading a program from the ROM 202 or the storage 204 into the RAM 203, and is executed when the user depresses the dividing transmission button displayed in the home screen 300. In the dividing scan control process shown in FIG. 14 as well, it is assumed that folders for storing image data is provided in the file server 102.

In FIG. 14, the CPU 201 executes the steps S901 to S910. When the processing in the step S909 or the step S910 is completed, the CPU 201 determines whether or not there has already been set a notification destination of an error notification (step S1401). In the step S1401, if the setting of the error notification transmission destination area 1301 is included in the acquired dividing scan settings data, the CPU 201 determines that there has already been set a transmission destination of the error notification. On the other, if no setting of the error notification transmission destination area 1301 is included in the acquired dividing scan settings data, the CPU 201 determines that there has been set no transmission destination of the error notification.

If it is determined in the step S1401 that here has already been set a transmission destination of the error notification, the CPU 201 transmits the error notification to the transmission destination indicated by the setting of the error notification transmission destination area 1301 (step S1402) and terminates the present process. If is determined in the step S1401 that here has been set no transmission destination of the error notification, the CPU 201 terminates the present process without transmitting the error notification.

In the embodiment described above, in a case where image data is OCR error image data, an error notification is transmitted to a transmission destination indicated by the setting of the error notification transmission destination area 1301 included in the dividing scan settings data. This enables the user to easily grasp details of an OCR error.

In the embodiment described above, OCR error image data may be stored in a folder subordinate to the folder indicated by the setting of the error-time transmission destination 505.

FIG. 15 is a view showing a still another example of the settings edit screen, denoted by reference numeral 1500, which is displayed on the display section of the PC 104 appearing in FIG. 1. The settings edit screen 1500 includes, in addition to the items of the settings edit screen 1300 shown in FIG. 13, a pull-down list box 1501. The pull-down list box 1501 is a list box for making a setting of a folder subordinate to the folder indicated by the setting of the error-time transmission destination area 505. From the pull-down list box 1501, it is possible to select one of "not create", "login user name", and "date". In a case where the user selects "not create", an OCR error image data is stored in the folder indicated by the setting of the error-time transmission destination area 505 included in the dividing scan settings data. In a case where the user selects "login user name", the OCR error image data is stored in a folder subordinate to the folder indicated by the setting of the error-time transmission destination area 505 included in the dividing scan settings data and having a folder name of a character string indicating a user who logged into the image forming apparatus 101. In a case where the user selects "date", the OCR error image data is stored in a folder subordinate to the folder indicated by the setting of the error-time transmission destination area 505 included in the dividing scan settings data and having a folder name of a date on which a document was read.

For example, a description is given of a case where a user who logged into the image forming apparatus 101 using a user name "Sato" has depressed the medical interview sheet button 801 associated with dividing scan settings data including "login user name" as the setting of the pull-down list box 1501. OCR error image data generated this time is stored in a folder 1601, appearing in FIG. 16, which is subordinate to the folder 1103 indicated by the setting of the error-time transmission destination area 505 included in the dividing scan settings data of the medical interview sheet button 801 and has a folder name "Sato".

Figure 16:
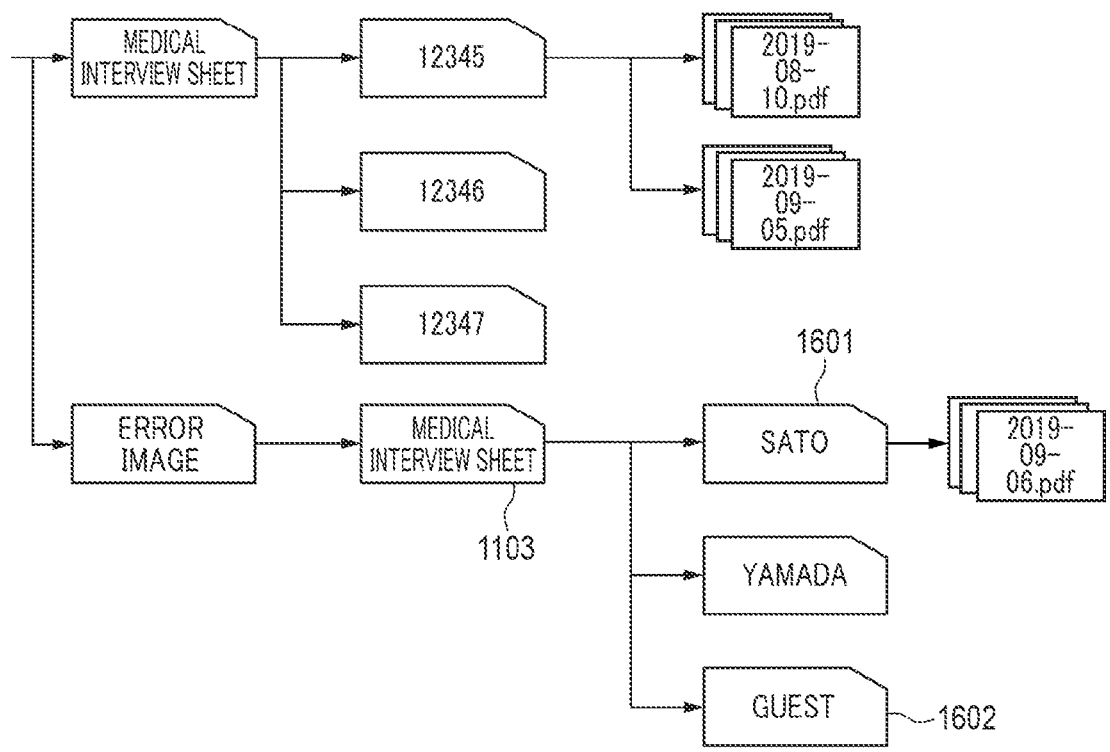
FIG. 16 is a diagram useful in explaining a storage destination where OCR error image data is stored.

Further, OCR error image data generated when a user who logged into the image forming apparatus 101 as a guest user has depressed the medical interview sheet button 801 is stored in a folder 1602, appearing in FIG. 16, which is subordinate to the folder 1103 and has a folder name "Guest".

In the embodiment described above, in a case where image data is OCR error image data, the image data is stored in a folder subordinate to the folder indicated by the setting of the error-time transmission destination area 505 included in the dividing scan settings data and having a specific name associated with the setting of the pull-down list box 1501. The specific name is a character string indicating a user who logged into the image forming apparatus 101. This makes it possible to suppress image data generated in response to an instruction by a different user from being mixedly stored in the folder where OCR error image data by one user is stored.

Further, in the embodiment described above, the specific name is a character string indicating the date on which a document was read. This makes it possible to suppress image data generated on a different date from being mixedly stored in a folder where OCR error data items generated on one data are stored.

Further, in the embodiment described above, image data which is not OCR error image data and OCR error image data are transmitted to respective different servers.

Although in the embodiment described above, folders where image data is stored are provided in the file server 102, this is not limitative, but, for example, the folders where image data is stored may be provided in the image forming apparatus 101. This makes it possible, under an environment in which image data is managed in the image forming apparatus 101, to reduce user time and effort in checking the OCR error image data.

In the embodiment described above, it is preferable that the name of a folder indicated by the setting of the error-time transmission destination area 505 included in the diving scan settings data includes a character string indicating an OCR error having occurred in the OCR processing. For example, the name of a folder wherein OCR error image data which does not satisfy the condition of the input field 508 included in the dividing scan settings data is set to "medical interview sheet_character number error". This makes it possible to easily know details of an OCR error from the name of a folder where OCR error image data is stored.

Further, in the embodiment described above, the name of a folder where OCR error image data is to be stored may be determined by the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132794 filed Jul. 18, 2019, which is hereby incorporated by reference herein in its entirety.

What is claimed is:
1. An information processing apparatus comprising:
a scanner that scans a document to generate image data;
a controller that obtains character information from an image of the image data,
wherein the controller performs a process for storing the image data in a folder; and
a display,
wherein, in a case where character information obtained from an image of first image data generated by the scanner satisfies a condition, the display displays the image of the first image data and information indicating a folder where the first image data is to be stored, while the controller performs the process for storing the first image data, the folder being a folder having a folder name including one or more characters indicated by the character information obtained from the image of the first image data, and
wherein, in a case where character information obtained from an image of second image data generated by the scanner does not satisfy the condition, the display displays an image of the second image data and information indicating a folder where the second image data is to be stored, while the controller performs the process for storing the second image data, the folder being a folder designated by a user before the character information is obtained from the image of the second image data.

2. The information processing apparatus according to claim 1,
wherein, in a case where the character information obtained from the image of the first image data satisfies the condition, the display displays the image of the first image data, the information indicating the folder where the first image data is to be stored and a file name of the first image data, while the controller performs the process for storing the first image data, and
wherein, in a case where the character information obtained from the image of the second image data does not satisfy the condition, the display displays the image of the second image data, the information indicating the folder where the second image data is to be stored and a file name of the second image data, while the controller performs the process for storing the second image data.

3. The information processing apparatus according to claim 1,
wherein the controller obtains the character information by a recognizing process on the image data generated by the scan of the document.

4. The information processing apparatus according to claim 3,
wherein the recognizing process is an OCR process.

5. The information processing apparatus according to claim 1,
wherein, in a case where the character information obtained from the image of the second image data does not satisfy the condition, the display displays the image of the second image data, the information indicating the folder where the second image data is to be stored and error information, while the controller performs the process for storing the second image data.

6. The information processing apparatus according to claim 5,
wherein the error information is information indicating that an error has occurred.

7. The information processing apparatus according to claim 1, further comprising
a communicator that transmits the image data,
wherein the communicator transmits the first image data for storing the first image data in the folder.

8. The information processing apparatus according to claim 1,
wherein the folder designated, before the character information is obtained, by the user is a folder having a folder name not including the character information obtained from the image of the second image data.

9. The information processing apparatus according to claim 1, further comprising
specifying, based on the obtained character information, the folder name of the folder for having the image data stored,
wherein the image data is stored in the folder having the specified folder name.

10. A method of controlling an information processing apparatus including a scanner, a controller and a display, the method comprising:
scanning, by the scanner, a documents to generate image data;
obtaining, by the controller, character information from an image of the image data; and
performing, by the controller, a process for storing the image data in a folder,
wherein, in a case where character information obtained from an image of first image data generated by the scanner satisfies a condition, the display displays the image of the first image data and information indicating a folder where the first image data is to be stored, while the controller performs the process for storing the first image data, the folder being a folder having a folder name including one or more characters indicated by the character information obtained from the image of the first image data, and
wherein, in a case where character information obtained from an image of second image data generated by the scanner does not satisfy the condition, the display displays an image of the second image data and information indicating a folder where the second image data is to be stored, while the controller performs the process for storing the second image data, the folder being a folder designated by a user before the character information is obtained from the image of the second image data.

11. The method according to claim 10,
wherein, in a case where the character information obtained from the image of the first image data satisfies the condition, the display displays the image of the first image data, the information indicating the folder where the first image data is to be stored and a file name of the first image data, while the controller performs the process for storing the first image data, and
wherein, in a case where the character information obtained from the image of the second image data does not satisfy the condition, the display displays the image of the second image data, the information indicating the folder where the second image data is to be stored and a file name of the second image data, while the controller performs the process for storing the second image data.

12. The method according to claim 10,
wherein the controller obtains the character information by a recognizing process on the image data generated by the scan of the document.

13. The method according to claim 12,
wherein the recognizing process is an OCR process.

14. The method according to claim 10,
wherein, in a case where the character information obtained from the image of the second image data does not satisfy the condition, the display displays the image of the second image data, the information indicating the folder where the second image data is to be stored and error information, while the controller performs the process for storing the second image data.

15. The method according to claim 14,
wherein the error information is information indicating that an error has occurred.

16. The method according to claim 10, further comprising
transmitting the first image data for storing the first image data in the folder.

17. The method according to claim 10,
wherein the folder designated, before the character information is obtained, by the user is a folder having a folder name not including the character information obtained from the image of the second image data.

18. The method according to claim 10, further comprising
specifying, based on the obtained character information, the folder name of the folder for having the image data stored, wherein the image data is stored in the folder having the specified folder name.

19. A non-transitory computer-readable storage medium storing a program that, when executed by a computer, causes the computer to perform a method of controlling an information processing apparatus including a scanner, a controller and a display, the method comprising:

scanning, by the scanner, a documents to generate image data;

obtaining, by the controller, character information from an image of the image data; and performing, by the controller, a process for storing the image data in a folder, wherein, in a case where character information obtained from an image of first image data generated by the scanner satisfies a condition, the display displays the image of the first image data and information indicating a folder where the first image data is to be stored, while the controller performs the process for storing the first image data, the folder being a folder having a folder name including one or more characters indicated by the character information obtained from the image of the first image data, and wherein, in a case where character information obtained from an image of second image data generated by the scanner does not satisfy the condition, the display displays an image of the second image data and information indicating a folder where the second image data is to be stored, while the controller performs the process for storing the second image data, the folder being a folder designated by a user before the character information is obtained from the image of the second image data.

\* \* \* \* \*